United States Patent
Kettlestrings

(10) Patent No.: US 6,375,141 B1
(45) Date of Patent: Apr. 23, 2002

(54) HANGER FOR VERTICAL STRUCTURAL MEMBER

(76) Inventor: Jack Kettlestrings, 900 Bainbridge Dr., Naperville, IL (US) 60563-2003

( * ) Notice: Subject to any disclaimer, the term of this patent is extended or adjusted under 35 U.S.C. 154(b) by 0 days.

(21) Appl. No.: 09/722,024

(22) Filed: Nov. 27, 2000

(51) Int. Cl.[7] .............................................. F16B 45/00
(52) U.S. Cl. ...................... 248/303; 248/302; 248/304; 248/218.4; 248/213.2; 211/106.1
(58) Field of Search ................................. 248/302, 303, 248/304, 218.4, 213.2; 211/206.1

(56) References Cited

U.S. PATENT DOCUMENTS

| | | | | |
|---|---|---|---|---|
| 1,007,843 A | * | 11/1911 | Botsford | |
| 1,039,367 A | * | 9/1912 | Dehn | |
| 1,220,717 A | * | 3/1917 | Bennett | |
| 1,728,613 A | * | 9/1929 | Jones | |
| 3,669,394 A | * | 6/1972 | Loucks | 248/221 |
| 4,232,847 A | * | 11/1980 | Cooper | 248/218.4 |
| 4,984,763 A | * | 1/1991 | O'Donnell | 248/218.1 |
| 5,476,240 A | * | 12/1995 | McDonough | 248/213.2 |

* cited by examiner

Primary Examiner—Leslie A. Braun
Assistant Examiner—Steven Marsh
(74) Attorney, Agent, or Firm—James Van Santen

(57) ABSTRACT

A specially formed hanger formed as a unitary bar, or rod, is formed and shaped to provide three point contact on two opposing side surfaces of a stud by means of torsion generated forces to resist downwardly and outwardly vectored gravitational loading forces resulting from supporting and/or suspending utilitarian loads on the hanger.

11 Claims, 2 Drawing Sheets

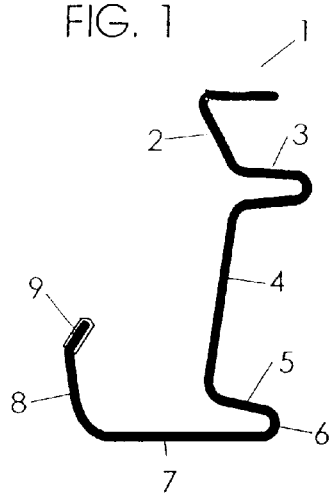
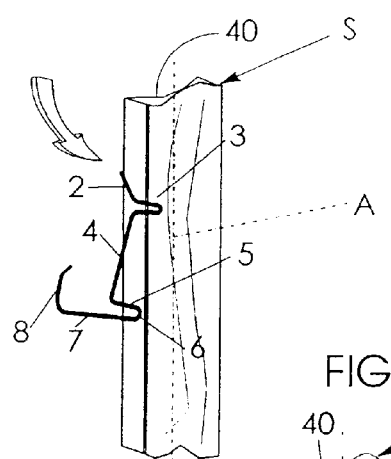
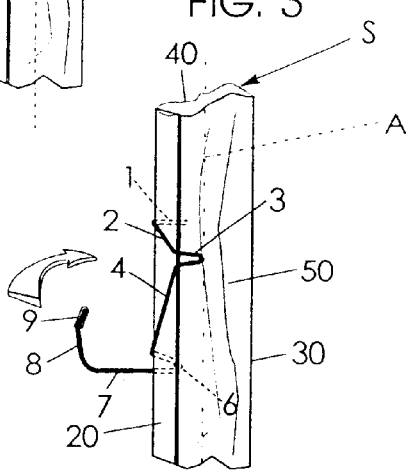
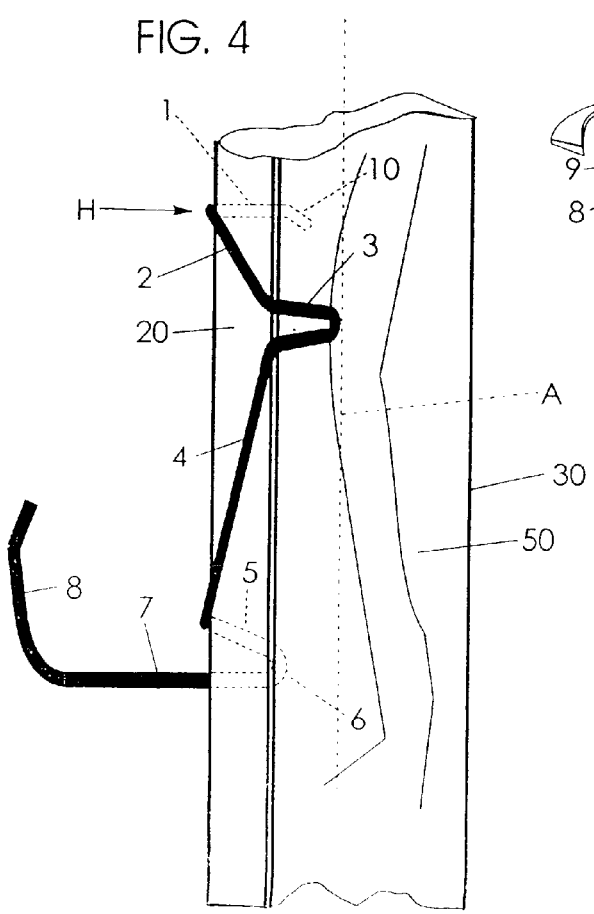

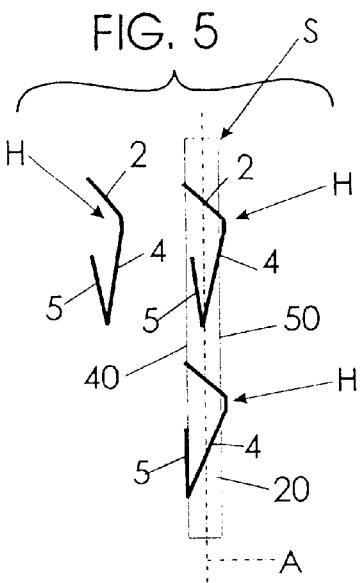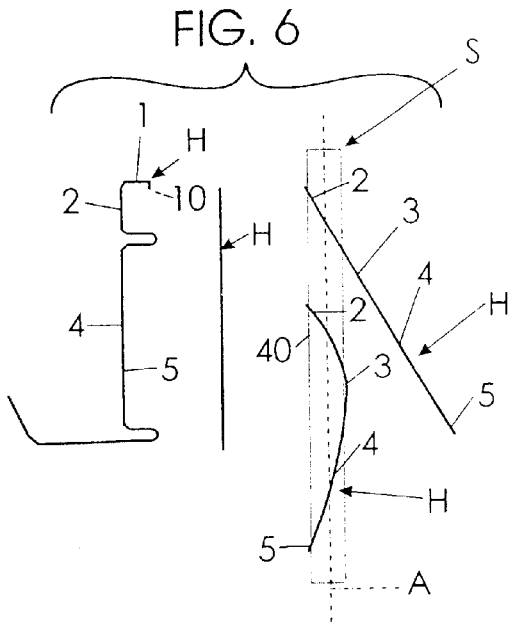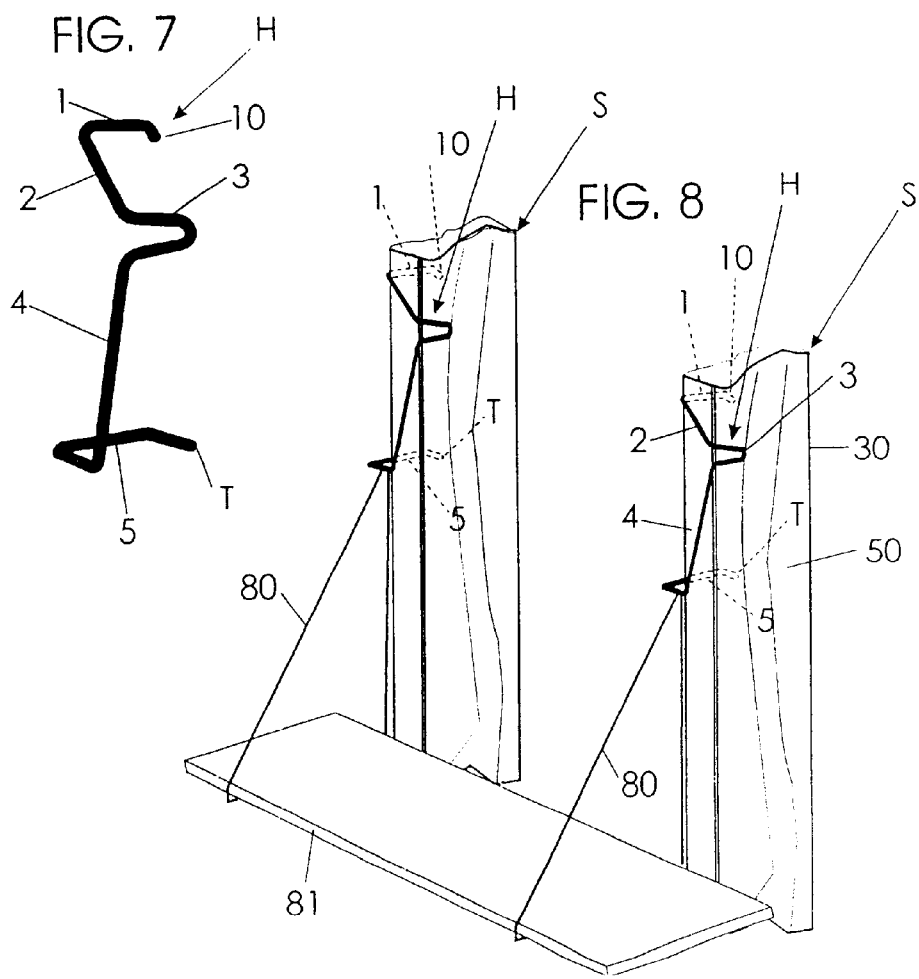

HANGER FOR VERTICAL STRUCTURAL MEMBER

BACKGROUND OF THE INVENTION

1. Field of the Invention

This invention relates generally to a tool less hanger construction suitable for use with vertical structural members such as wall studs used in architectural applications.

2. The Prior Art

Many hanger devices are available in the market by means of which tools and other miscellaneous objects may be suspended from vertical structures such as the exposed studs in a garage or in a basement workshop area. The majority of such hanger devices require one or more tools to install. Installation may range from the utilization of simple nails for retention to complex clip assemblies secured by screws, or nails.

The prior art relating to a so-called tool-less hanger is exemplified by U.S. Pat. No. 5,577,699 issued Nov. 26, 1996 and entitled,"Hanger and Method of Attachment." There is disclosed a hanger for engagement on a support member having a front face and first and second parallel sides. The hanger has a load bearing portion and a support member engagement portion formed with a fulcrum. Arm members attached to hook members having sharpened ends embrace the support member. The parts are disposed so that the load-bearing portion rotates on the fulcrum under load in order to exert leverage to embed the sharpened points into the first and second parallel sides of the support member.

SUMMARY OF THE PRESENT INVENTION

A specially formed two or three dimensional shaped hanger article grips structural forms, such as vertical slabs, boards, or poles, with three point contact on two opposing side surfaces of the structural form by means of torsion generated forces to resist downwardly and outwardly vectored gravitational forces caused by the object supported from an outwardly extended portion of the shaped hanger article.

More particularly, the present invention contemplates the utilization of an elongated wire-form, or rod-form, member which is specially pre-formed by bending or molding into a utilitarian hanger unit characterized by a three-dimensional configuration that will allow the hanger to grip, or clamp, a vertical structural member with three point contact on only two opposing side surfaces of the structural member by means of torsion generated forces. The hanger thus provided will effectively resist downwardly and outwardly vectored gravitational forces caused by objects supported from, or suspended by, an outwardly extended portion of the hanger.

BRIEF DESCRIPTION OF THE SEVERAL VIEWS OF THE DRAWING

FIG. 1 is a perspective view of a hanger provided in accordance with one form of this invention wherein the wire form, or rod form, stock used as the source material for the hanger article is bent and shaped in three dimensions.

FIG. 2 is a perspective view of the hanger of FIG. 1, but depicted in its initial stage of installation on a typical structural form such as a wooden wall stud of the type used in an architectural structure.

FIG. 3 is a perspective view of the hanger of FIGS. 1 and 2, but depicted in its final stage of installation on the wall stud.

FIG. 4 is a perspective view similar to FIG. 3, somewhat enlarged to show additional details of the hanger when fully assembled in operating position on a wall stud.

FIG. 5 is a rear elevational composite view in three parts showing in the left hand part the shape of the hanger of FIG. 1, in the upper right hand part the shape and relationship of the hanger of FIG. 2 as installation on a stud is begun and deformation of the hanger occurs to store clamping energy in the hanger, and in the bottom right part the shape of the hanger in FIGS. 3 and 4 when installation is complete and the hanger is in its fully operative position.

FIG. 6 is a composite view of a second form of the invention wherein the wire form, or rod form, stock for the hanger article is formed in only two dimensions, the hanger being shown in a front elevation at the left, in a side elevation in the middle, and in two different phases of installation at the top and the bottom, respectively, on the right.

FIG. 7 is a perspective view of a third form of the invention wherein the bottom leg of the hanger unit is modified to accomplish a different mode of utilitarian support, as depicted in FIG. 8.

FIG. 8 is a fragmentary view showing two of the hangers of FIG. 7, each hanger having a cord suspended therefrom to carry a shelf.

DETAILED DESCRIPTION OF THE INVENTION

The hangers of this invention may be formed from metal stock constituting a wire-form product, or from a rod-form product. It is possible that the stock could also be a plastic product, provided the material is sufficiently tough, springy, elastic, and pliable to be bent, formed, molded or shaped into a pre-formed two or three-dimensional shape. The hangers must exhibit the requisite characteristics of this invention, i.e., resiliency. Another proviso is that the end product must display characteristics of memory so that energy may be stored in the hanger by pre-determined deformation necessitated during installation whereupon a suitable squeezing or clamping action will be developed relative to an adjoining architectural structure.

The theory upon which the principles of the present invention are based is that the directional forces causing the engagement of the hanger device are significantly different from the directional forces applied during the functional operation of the hanger device. Hence, I have discovered that the holding forces need only be applied to the opposing sides of the support structure, thereby eliminating the necessity of using nails, or screws without a loss of function.

Referring to FIG. 1, there is illustrated for descriptive purposes a conventional 2"×4" wall stud "S" commonly used in constructing architectural buildings such as houses, garages and other utilitarian structures. A hanger 10 provided in accordance with the teachings of the present invention finds particular utility with such a wall stud S, especially since such a stud "S" is customarily disposed vertically. It is with that type of support structure that the present invention is very effective. Since the stud "S" is disposed vertically, there is shown a vertical center axis "A" with respect to which axis "A" the hanger of the present invention is oriented. Thus, gravitational forces imposed on a hanger carried by the stud "S" may be exploited to promote a squeezing, or clamping, action to retain a hanger on the stud "S" without the use of special tools or supplemental fastening means.

In accordance with this invention, a hanger "H" is provided for use with a conventional 2×4 stud "S" of the type having a rectangular cross-section. When incorporated in an architectural structure such as a residence, a garage, or any other kind of a building, the stud "S" has a front face 20, a rear face 30, a first side face 40 and a second side face 50. The faces of the stud "S" are each spaced outwardly of the vertical center axis "A." Together with one another, the faces form a rectangle in cross-section.

A first form of the invention is illustrated in FIGS. 1–5 of the drawings, wherein the hanger "H" is pre-formed in three dimensions to achieve the features desired. A second form of the invention is illustrated in FIG. 6 of the drawings, wherein the hanger "H" initially formed in two dimensions is deformed by the user in situ into its ultimate utilitarian position and shape. A third form of the invention illustrated in FIGS. 7 and 8 is merely a modified form of suspension means for a selected end use.

The hanger "H" is a one-piece article consisting of a unitary elongated member made of ductile material exhibiting memory characteristics to provide parts discernibly identifiable for purposes of this disclosure from top-to-bottom as parts designated on the drawings by numbers 1–5, inclusive. Using those designations, each of the parts 1–5 may be more particularly described as follows, referring first of all to FIGS. 1–5.

(1) A leg (1) is situated at one end of the hanger "H" corresponding to the top end of the elongated member. The leg (1) is adapted to be positioned in laterally spaced relationship to the axis "A" and abuts the first side face 40 of the stud "S." The leg (1) is disposed to extend horizontally and forwards relative to the stud "S" and its vertical center axis "A."

(2) A leg (2) is offset at right angles to the leg (1) and is adapted to be spaced forwards the vertical axis "A." The leg (2) extends downwardly and laterally across the front face 20 of the stud "S."

(3) A "U" shaped leg (3) offset at right angles to the leg (2) is adapted to be spaced laterally from the vertical axis "A" of the stud "S," but in the opposite lateral direction as the leg (1), so that the leg (3) adjoins the side face 50 and is disposed to have one of its arms extend horizontally and rearwardly from the plane of the leg (2), terminating in a bight portion abutting the side face 50. The other of its arms extends horizontally and forwards from the bight portion in parallel spaced relation to the one arm back to the plane of the leg (2).

(4) A leg (4) is offset at right angles to the U-shaped leg (3) and is adapted to extend generally downwardly. In the form of the invention of FIGS. 1–5 and FIGS. 7 and 8, the leg (4) may be pre-formed to extend at least part way in a lateral direction towards the plane of the leg (1). However, an important functional feature of this invention is provided by this portion of the hanger "H." First of all, note the additional structure of the next part.

(5) A leg (5) has at least a portion thereof offset at right angles to the leg (4) and is adapted to extend rearwardly and horizontally in spaced relation to the vertical axis "A." It should be noted that the leg (5), when pre-formed, is not disposed in the same identical plane as the leg (1).

What I will now refer to as (4a) is of particular pertinence to the aforementioned feature. The leg (4) is sufficiently ductile and the hanger "H" sufficiently resilient, that the user can place leg (1) on the first side face 40 with the leg (2) extending across the front face 20 and the leg (3) is placed on the second side face 50, whereupon the leg (4) is deformably sprung so that the leg (5) is resiliently loaded against the side face 40. The start of such action is depicted on FIG. 2 of the drawings wherein the leg (3) is aligned so that it can be seated against the side face 50 and the hanger "H" is swung in the direction of the arrow so that the leg 5 can be more or less wedged against the side face 40 by moving the hanger "H" in the direction of the arrow as shown in FIG. 3. When such deformation of the leg (4) occurs under the effect of applied torsion force, the spring loaded energy stored in the hanger "H" will exert a three point squeezing or clamping action on the stud "S," namely, at the first point of contact between the leg (1) and the side face 40, at the second point of contact between the leg (3) and the side face 50, and at the third point of contact between the leg (5) and the side face 50.

Furthermore, when vertical load forces are applied to the leg (5), the grip provided by the squeezing and clamping on the side faces 40 and 50 actually becomes more pronounced, or intense.

In order to provide loading means for the hanger "H" the leg (5) may be provided as a "U" shaped part wherein a first arm extends rearwardly and horizontally relative to the axis "A" and terminates in a bight 6 engaging the side face 40 of the stud "S." A second arm 7 extends forwards from the bight 6 and horizontally parallel to the first arm and projects sufficiently forwards so that loads may be supported and/or suspended therefrom.

As shown in the drawings, the projecting second arm 7 of the leg (5) may be so shaped and formed to provide a hook shaped support on the hanger "H" from which utilitarian loads may be supported and/or suspended. In FIG. 4 there is shown a second arm 7 with an offset finger 8 capped by a plastic ring or ferrule 9 forming a rounded smooth protective surface which cushions the extreme end of the hanger article and safeguards the user.

At the top end of the hanger article, in order to enhance the gripping and clamping action of the leg (1), the very upper end of the leg (1) is sufficiently upset to form a toe 10 which projects as a spur, or foot, towards the side face 40. When the hanger "H" is in use, the toe 10 actually penetrates the surface of the side face 40, especially if the side face 40 is provided by a wooden stud "S," or the like. Thus, the engagement of the leg (1) with the side face 40 is sufficient to resist displacement of the hanger "H."

In FIG. 5, the drawing is virtually a three part composite line drawing wherein the left hand part is a view taken in elevation of the hanger "H". The view on the upper right shows the hanger "H" positioned similarly to FIG. 2, i.e., with leg (1) engaged with the side face 40 and leg (3) engaged, or positioned to be engaged, with the side face 50. The bottom view shows the leg (4) deformed so that the leg (5) can be engaged with the side face 50 as described above.

In FIG. 6, also a composite line drawing, the hanger "H" is formed by bending or shaping in only 2 dimensions. Thus, the left hand view is a front elevation and the middle view is side elevation. The right hand side of the drawing depicts, on the top, how the hanger "H" is placed against the stud "S" with the leg (1) engaged against the side face 40. The user then places the leg (2) across the front face of the stud "S" so that the leg (3) can be placed against the side face 50 of the stud "S." The user then deforms the hanger "H" by bending the leg (4) across the front face 20 of the stud "S" so that the leg (5) may be engaged with the side face 40 of the stud "S".

In FIG. 7, the leg (5) differs from the leg (5) in FIGS. 1–5 in that it terminates in a toe "T" engageable with the side face 40. A corded loop 80 may be attached to the leg (5). If two such hangers "H" are arranged in spaced relation on adjoining or neighboring studs "S" a shelf 81 may be supported in the corded loops 80.

While various modifications might be suggested by those artisans skilled in the art it should be understood that I wish to embody within the scope of the patent warranted hereon all such modifications as reasonably and properly come within the scope of my contribution to the art.

I claim as my invention:

1. A hanger for use with a 2×4 stud having a vertical center axis, first and second side faces and front and rear faces, said hanger consisting of a unitary elongate member made of resilient material exhibiting characteristics of memory after deformation, and having parts identifiable from top-to-bottom as parts 1–5, inclusive, and each said part more particularly comprising:
- (1) a leg (1) adapted to be spaced laterally from the vertical axis of the stud and abutting a first side face of the stud and disposed to extend horizontally and forwards,
- (2) a leg (2) offset at right angles to said leg (1) and adapted to be spaced forwards of the vertical axis and extending downwardly and laterally across the front face of the stud,
- (3) a "U" shaped leg (3) offset at right angles to said leg (2) adapted to be spaced laterally from the vertical axis of the stud and adjoining a second side face of the stud and disposed to extend horizontally and rearwardly,
- (4) a leg (4) offset at right angles to said "U" shaped leg (3) and adapted to extend downwardly across the front face spaced forwards of the vertical axis,
  - (4a) said leg (4) being resiliently deformable when moved toward said first side face of the stud when leg (1), leg (2), and leg (3) are positioned relative to the stud,
- (5) and a leg (5) having at least a portion thereof offset at right angles to said leg (4) and extending rearwardly and horizontally in spaced relation to the vertical axis and engageable with said first side face of the stud to lock the hanger with a squeezing and clamping action.

2. A hanger as defined in claim 1, wherein said leg (5) comprises a "U" shaped leg with parallel arms joined by a bight so that one arm of the "U" shaped leg extends forwards from which utilitarian loads may be supported and/or suspended.

3. A hanger as defined in claim 2 wherein said forwards projecting arm of said "U" shaped leg (5) has an upwardly projecting finger, thereby to provide a hook-like support from which the utilitarian loads may be supported and/or suspended.

4. A hanger as defined in claim 3, and a plastic ferrule cap on the end of said finger to provide a rounded safety cover on the free end of the finger.

5. A hanger as defined in claim 1, and a looped cord connected to and supported by said leg (5) from which utilitarian loads may be supported and/or suspended.

6. A hanger as defined in claim 1 wherein said legs (1)–(5) are pre-formed in three dimensions.

7. A hanger as defined in claim 1 wherein said legs (1)–(5) are pre-formed in two dimensions.

8. A hanger as defined in claim 1 wherein said leg (1) has an offset toe adapted to function as a spur and thereby to enhance the purchase of the hanger with the stud.

9. An elongated rod-form hanger bar having an included length extending downwardly relative to an established vertical axis of a support stud, said hanger bar extending longitudinally from an upper end towards a lower end and formed to provide discernible identifiable portions (1)–(5) from top-to-bottom and wherein said portions (1)–(5) more particularly comprise:
- (1) a leg (1) adjoining laterally left of said vertical axis and extending forwards to lie adjacent one side surface of the stud,
- (2) an offset leg (2) at right angles to said leg (1) spaced forwards of said vertical axis and extending downwardly and laterally right to an opposite side side surface of the stud,
- (3) a "U" shaped leg (3) at right angles to said leg (2) having parallel arms joined by a bight and extending rearwardly in laterally right spaced relation to said axis to lie adjacent the second side surface of the stud,
- (4) an offset leg (4) at right angles to said leg (3) and extending downwardly and laterally,
  - (4a) said offset leg (4) being deformably sprung laterally across the front face of the stud and being extendable towards the plane of said leg (1),
- (5) a "U" shaped leg having parallel spaced arms joined by a bight and extending rearwardly in laterally left spaced relation to the vertical axis and lying in abutting engagement with said first side face of the stud when said leg (4) is biased and deformably loaded to squeeze and clamp the hanger on the stud.

10. An elongated rod-form hanger as defined in claim 9 wherein said leg (5) has a forwards projecting hook shaped support formed at the lower end extremity of the rod-form hanger from which utilitarian loads may be supported and/or suspended, and a plastic ferrule cap on the end of the hook shaped support providing a rounded cushioning surface.

11. A hanger as defined in claim 9 and said leg (1) having an offset toe formed on the end extremity thereof to provide a spur for enhancing the engagement of leg (1) with the adjoining side face of the stud.

* * * * *